April 8, 1930.  F. PINK  1,754,119
APPARATUS FOR SEPARATING LIQUIDS OF DIFFERENT DENSITIES
Filed March 29, 1928  2 Sheets-Sheet 1
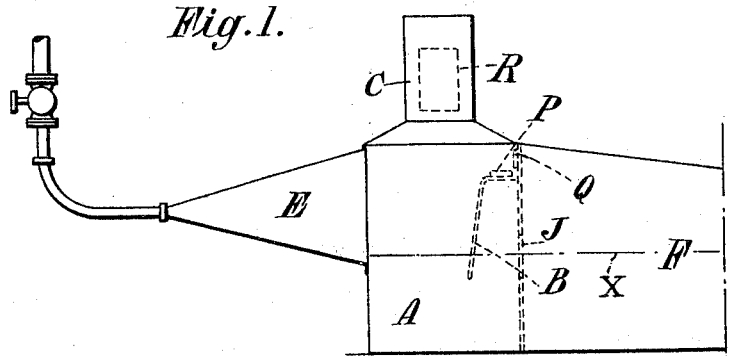
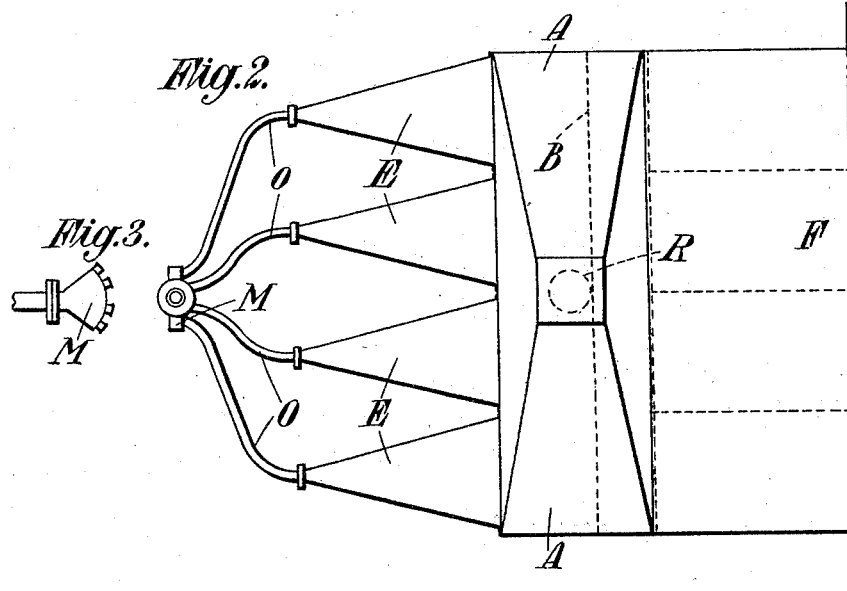
INVENTOR
FRANK PINK
BY *HCHeide*
ATTORNEY April 8, 1930.  F. PINK  1,754,119
APPARATUS FOR SEPARATING LIQUIDS OF DIFFERENT DENSITIES
Filed March 29, 1928   2 Sheets-Sheet 2
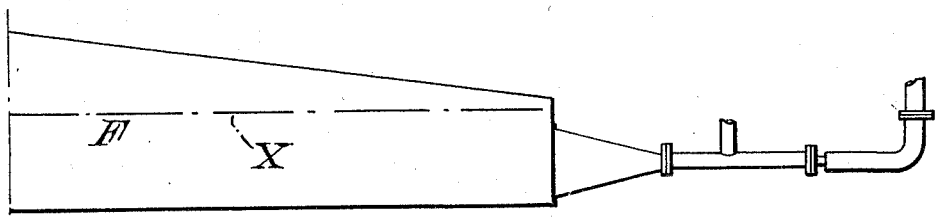
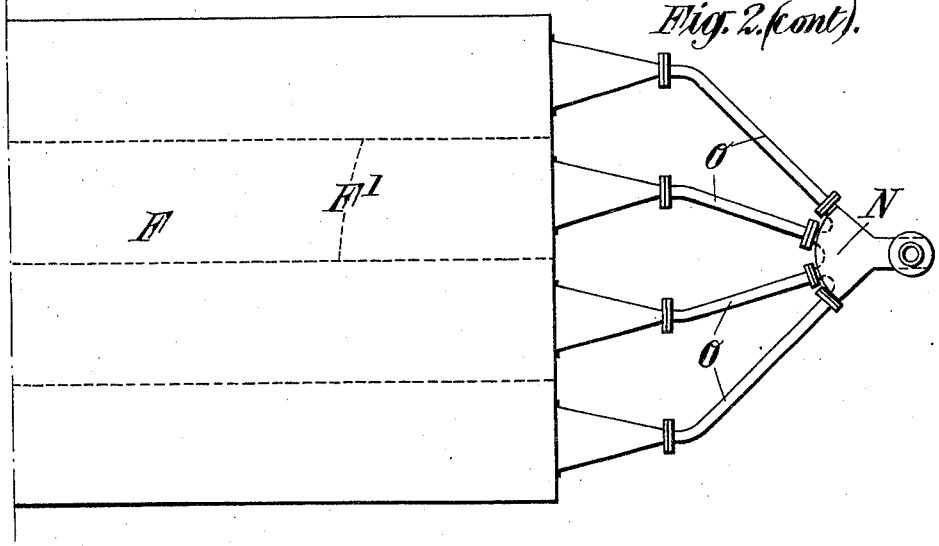
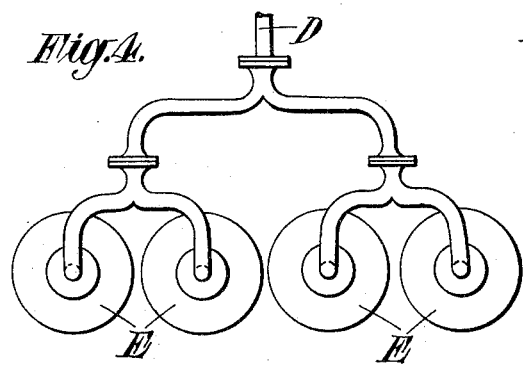
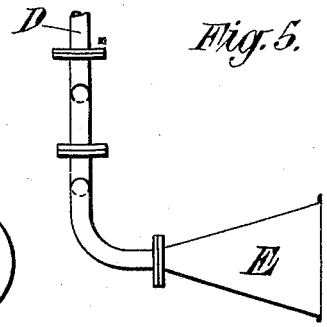
INVENTOR
FRANK PINK
BY
ATTORNEY Patented Apr. 8, 1930

1,754,119

UNITED STATES PATENT OFFICE

FRANK PINK, OF PORTSMOUTH, ENGLAND

APPARATUS FOR SEPARATING LIQUIDS OF DIFFERENT DENSITIES

Application filed March 29, 1928, Serial No. 265,713, and in Great Britain January 27, 1928.

This invention relates to improvements in apparatus for separating liquids of different densities in which the mixture is caused to flow through a vessel for carrying out a gravity separation.

It is believed that in separating liquids of different densities (for example, the separation of oil and water) the condition of flow of the mixture through the separator should be a non-sinuous or stream like motion and not a turbulent motion in which eddies are generated, so as to allow the lighter liquid to rise up from the heavier liquid without being caught by eddying currents.

An object of the present invention is to slow down the flow of the mixture in the separator and avoid any churning action of the mixture.

According to the present invention there is provided means whereby the rate of flow of the mixture on its way to the inlet or inlets of the separator is slowed down so that the flow through the vessel takes place with a non-turbulent stream-like motion.

By the present invention the velocity of the mixture is reduced before it actually gets into the separator.

By the present invention the mixture (for example, oil and water) can be made to enter the separator at a suitable speed, a speed not exceeding 2 ft. per minute has been found by experiment to be a suitable rate of flow, but it is to be understood that the invention is not limited to this rate of flow. An entry at this speed of the mixture into a separator expedites the rising of the lighter liquid.

In the drawings there is shown diagrammatically a form of apparatus embodying the present invention, Fig. 1 being a side elevation, Fig. 2 a plan. Fig. 3 is a detail view of one of the junction boxes, while Figs. 4 and 5 are end and side views respectively of an inlet pipe system which may be used.

Referring to the example of apparatus shown in the drawings the first part of the separation of oil and water is done in a chamber A about 6 ft. long. The bulk of the oil out of the mixture is caught in this first part, and rises and collects in a collecting compartment C. The oily water then goes under a baffle B and through openings J into the second part of the separator which is indicated by the reference letter F. This second part may be of any suitable construction.

With a 200 ton plant a 6" inlet pipe is a suitable inlet pipe, and the liquid enters this inlet pipe at 600 ft. per minute.

A single cone shaped inlet to take this quantity is not practicable for working, so that the inlet to the separator is split up, that is to say the inlet is divided say into four parts. The 6" pipe D (Figs. 4 and 5) branches into two, and each of these two branches again branches into two, so that the mixed liquid starts entering the cones E at 150 ft. per minute, and the speed is reduced to 2 ft. per minute when it enters the first part A of the separator.

The speed of the liquid through the second part F of the separator is approximately 2½ ft. per minute. The second part of the separator may have vertical partitions $F^1$, and baffles (not shown) may be provided. These baffles may be fixed or adjustable.

A 50 ton separator may be a quarter of the width, with one coned entry.

M indicates a junction box at the inlet side, N a junction box at the outlet side, and O flexible pipes. P is a valve (flap valve) for the lighter liquid to pass from the area behind the baffle to the lighter liquid collecting compartment. Q is a valve (non-return valve) to allow the lighter liquid to pass from the part F to the lighter liquid collecting compartment.

The lighter liquid collecting compartment C may have any suitable lighter liquid discharge, for example, a valve under a known float control. R indicates a float for controlling the discharge valve for the lighter liquid, which float may be directly or indirectly connected to the discharge valve. Or the float may control an electrical device for actuating the valve.

As examples of float controls suitable for embodiment with apparatus according to the present invention reference is directed to my prior Patent No. 1,698,002.

Heating coils may be provided in the separator.

The apparatus may be built into a ship as a part thereof, or the double bottom of a ship may be adapted for use as a separator.

On the drawing the inlets are shown circular but the cones may have rectangular bases. Any suitable angle of flare may be given to the coned inlets, or a curved cone may be used similar to a "loud speaker" cone. Moreover it is to be understood that the inlets may be of any suitable shape and are not confined to cone or trumpet shape.

The exits from the separator may be suitably shaped, as for example, cone or trumpet shaped.

The level of the mixture in the apparatus is indicated by the line marked X. As the mixture flows through the apparatus, the lighter liquid rises and flows to the collecting compartment C. The sloping roof facilitates this flow of the lighter liquid from F.

The body of liquid below the line X is substantially the height of the mixture of the lighter and heavier liquids, while the body of liquid above the line X is the lighter liquid separated from the mixture. In other words, the line X represents, substantially, the plane of separation of the lighter liquid from the mixture. The lighter liquid accumulating in the vessel part F creeps slowly upwardly and forwardly and returns to the vessel part A for collection in the top thereof, the body of the mixture below the line X being undisturbed in its straight passage from front to rear in the separating vessel A, F.

What I claim is:—

1. An apparatus for separating liquids of different densities, comprising a horizontal separating vessel composed of front and rear chambers with communicating openings therebetween, a depending baffle in the front chamber, one way valve means in the baffle and between the chambers opening toward the top of the front chamber, a plurality of parallel conical inlet members located exteriorly of and opening at their base portions into the forward end of said front chamber, a single source of mixture supply connected to the smaller ends of said conical inlet members for delivering the mixture thereto, said conical members proportionately increasing in cross sectional area toward the front chamber to reduce the velocity of the mixture before reaching the chamber to such extent as to prevent turbulent movement of the mixture into and through the horizontal vessel, and means in the upper part of the front chamber for drawing off the segregated lighter liquid from the mixture.

2. An apparatus for separating liquids of different densities, comprising a horizontal separating vessel decreasing in height from its forward to its rear end and composed of front and rear chambers with communicating openings therebetween, a depending baffle in the front chamber, one way valve means in the baffle and between the chambers opening toward the top of the front chamber, drawing off means for the lighter liquid of the mixture disposed at the upper portion of the front chamber, a feed pipe at the forward end of the apparatus for supplying the mixture to be separated, an outlet pipe for the heavier liquid at the rear end of the apparatus, a plurality of conical inlet members connected in common at their smaller ends to the feed pipe and connected at their larger ends to the front chamber of the separating vessel for conducting the mixture from the feed pipe to the vessel and reducing the velocity of the mixture prior to entering the front chamber, and a plurality of outlet members connected at their larger ends to the rear end of the rear chamber and at their smaller ends to said outlet pipe to carry off at an increasing velocity the heavier liquid passing entirely through the separating vessel.

In testimony whereof, I affix my signature.

FRANK PINK.